United States Patent [19]

Mandel et al.

[11] 4,382,280

[45] May 3, 1983

[54] ELECTRONIC HORSE RACE ANALYZER

[75] Inventors: Evan W. Mandel, Rye; William Quirin, Queensvillage, both of N.Y.

[73] Assignee: Mattel, Inc., Hawthorne, Calif.

[21] Appl. No.: 221,487

[22] Filed: Dec. 30, 1980

[51] Int. Cl.[3] .................... G06F 15/28

[52] U.S. Cl. .................... 364/412; 364/709; 364/710

[58] Field of Search .................... 364/410, 412, 419, 709, 364/710, 900

[56] References Cited

U.S. PATENT DOCUMENTS

| | | | |
|---|---|---|---|
| 3,124,674 | 3/1964 | Edwards et al. | 364/900 |
| 3,569,686 | 3/1971 | Comorau | 364/410 |
| 4,031,376 | 6/1977 | Corkin, Jr. | 364/412 |
| 4,172,285 | 10/1979 | Yoshida et al. | 364/710 |

*Primary Examiner*—Errol A. Krass

*Attorney, Agent, or Firm*—Reagin & King

[57] ABSTRACT

A handheld electronic thoroughbred horse race analyzer includes a housing carrying a display and a number of input keys. The display is controlled by an internal microprocessor to show prompting messages to which an operator responds by depressing selected keys to provide information regarding the history of each horse in a race. The display ultimately provides a rating for each of the top horses.

5 Claims, 8 Drawing Figures

ELECTRONIC HORSE RACE ANALYZER

BACKGROUND OF THE INVENTION

This invention relates to electronic analyzers and, more particularly, to an electronic horse race analyzer.

Sporting events have been popular throughout the ages. Races have always been among the most popular sporting events, especially horse races. People have been entranced by horse races of all kinds and especially by thoroughbred horse racing. Methods for predicting the outcome of such races have been devised by any number of people. However, those methods which offer some predictability are so complicated as to be unusable by the average person. There have, therefore, been various attempts to mechanize these methods. However, to date, none of these attempts has produced a useful thoroughbred horse race analyzer.

Accordingly, it is an object of this invention to provide a new and improved method for analyzing thoroughbred horse races. It is another object of this invention to provide a new electronic horse race analyzer.

It is still another object of this invention to provide a hand-held electronic thoroughbred horse race analyzer.

SUMMARY OF THE INVENTION

The foregoing and other objects of the invention are accomplished by a hand-held electronic horse race analyzer which utilizes a unique method of analyzing the results of information regarding the backgrounds of horses entered in a thoroughbred horse race. The analyzer has a housing upon which are mounted keys used for providing information regarding the histories of the individual horses and the details of the particular race to be run. The housing also has a display which is utilized for checking information as it is provided to the analyzer and for showing the results provided by the analyzer. A control circuit mounted within the housing operates in response to the information provided by the keys to analyze the race based on the average earnings of the horse, its post position, the number of days since the last race, the horse's record, the horse's length behind, speeds of the horses at particular positions of past races, the overall speed rating of the horses, and other information to provide output information regarding most likely winners.

Other objects, features, and advantages of the invention will become apparent by reference to the specification taken in conjunction with the drawings in which like elements are referred to by like reference designations throughout the several views.

DESCRIPTION OF THE PREFERRED EMBODIMENT

Figure 1:
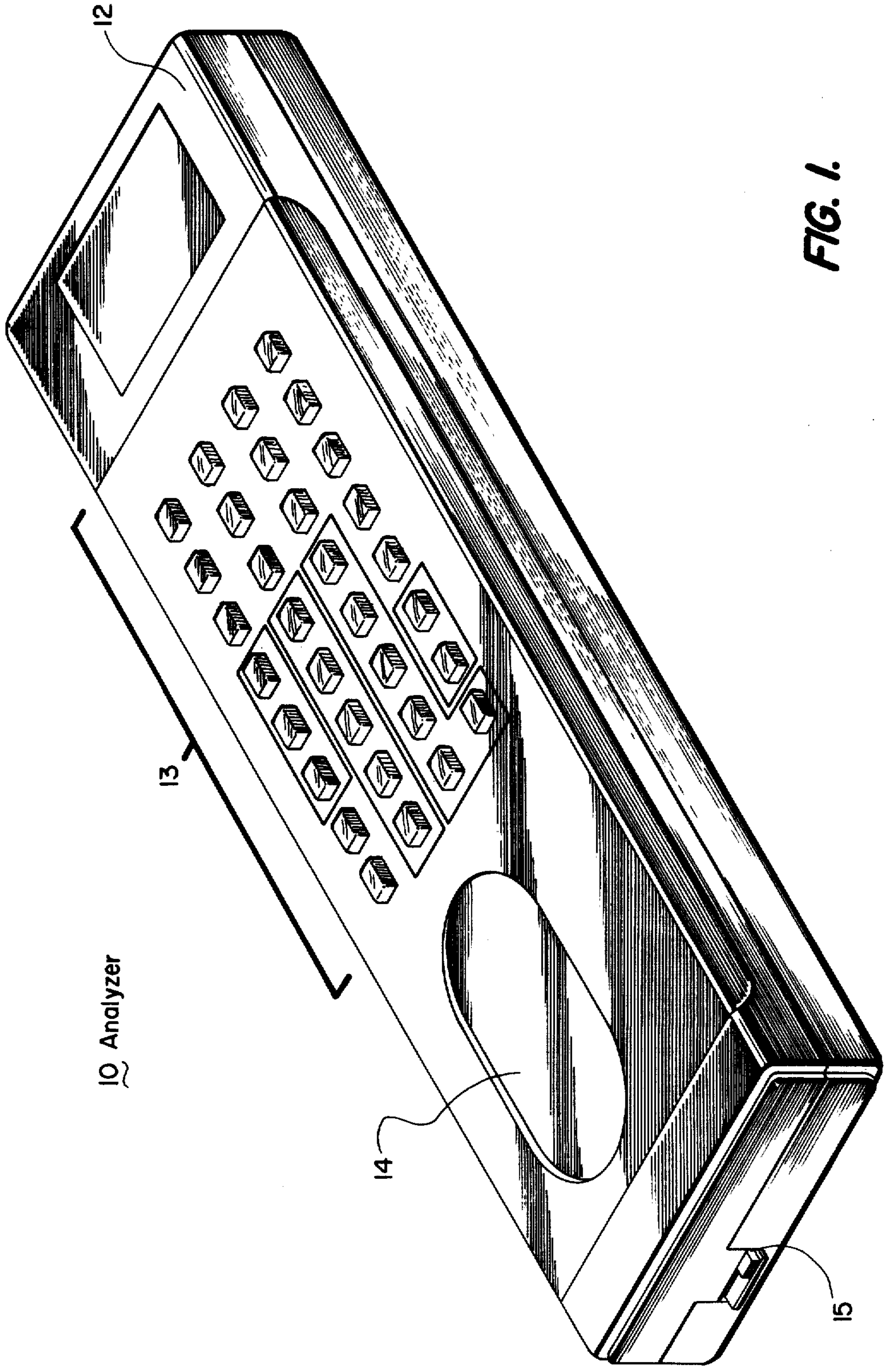
FIG. 1 is a perspective view of an electronic game constructed in accordance with this invention.

Referring now to the drawings and, more particularly, to FIG. 1, there is shown a perspective view of a portable electronic thoroughbred horse race analyzer 10 constructed in accordance with the invention. The analyzer 10 has a housing 12 which is, in the preferred embodiment, constructed of upper and lower plastic portions and which has on its lower surface, although not shown in FIG. 1, an opening for inserting batteries to provide electrical power to the analyzer 10. The upper surface of the housing 10 mounts a number of input switches or keys generally designated 13 and a display 14. An off/on switch 15 is positioned at the left end of the housing 12. The keys 13 are used for entering data which is utilized by the analyzer 10 for providing results which are displayed on the display 14 for use by the operator.

Mounted within the housing 12 in a manner conventional for such circuitry are electronic elements (none of which are shown in FIG. 1) including a control circuit utilized to accomplish the purposes of this invention. As will be understood by those skilled in the art, the control circuit of this invention may be implemented in any of a number of different ways. However, as with many prior art electronic circuits, the preferred embodiment of the invention utilizes an integrated circuit microprocessor (a miniature electronic digital computer). Such integrated circuit microprocessors are well known and include all of the input, output, memory, logic, and control circuitry of a special purpose digital computer in miniature form. In general, such circuits have both random access memory (RAM) and read only memory (ROM). The RAM of the microprocessor is utilized for storage of various bits of information utilized during the operation of the circuitry. The ROM has connections formed by masking operations accomplished during the construction of the basic circuitry of the control circuit to provide a completely wired circuit which includes the program for controlling the operation of the microprocessor. Such an arrangement is sometimes described as a dedicated memory circuit.

Various microprocessing circuits are offered by a number of manufacturers and are well known to the prior art. A preferred embodiment of the present invention uses a Texas Instruments TMS1100 microprocessor. Further information on the specific details of this microprocessor are available in the TMS1100 User's Manual published by Texas Instruments.

Figure 2:
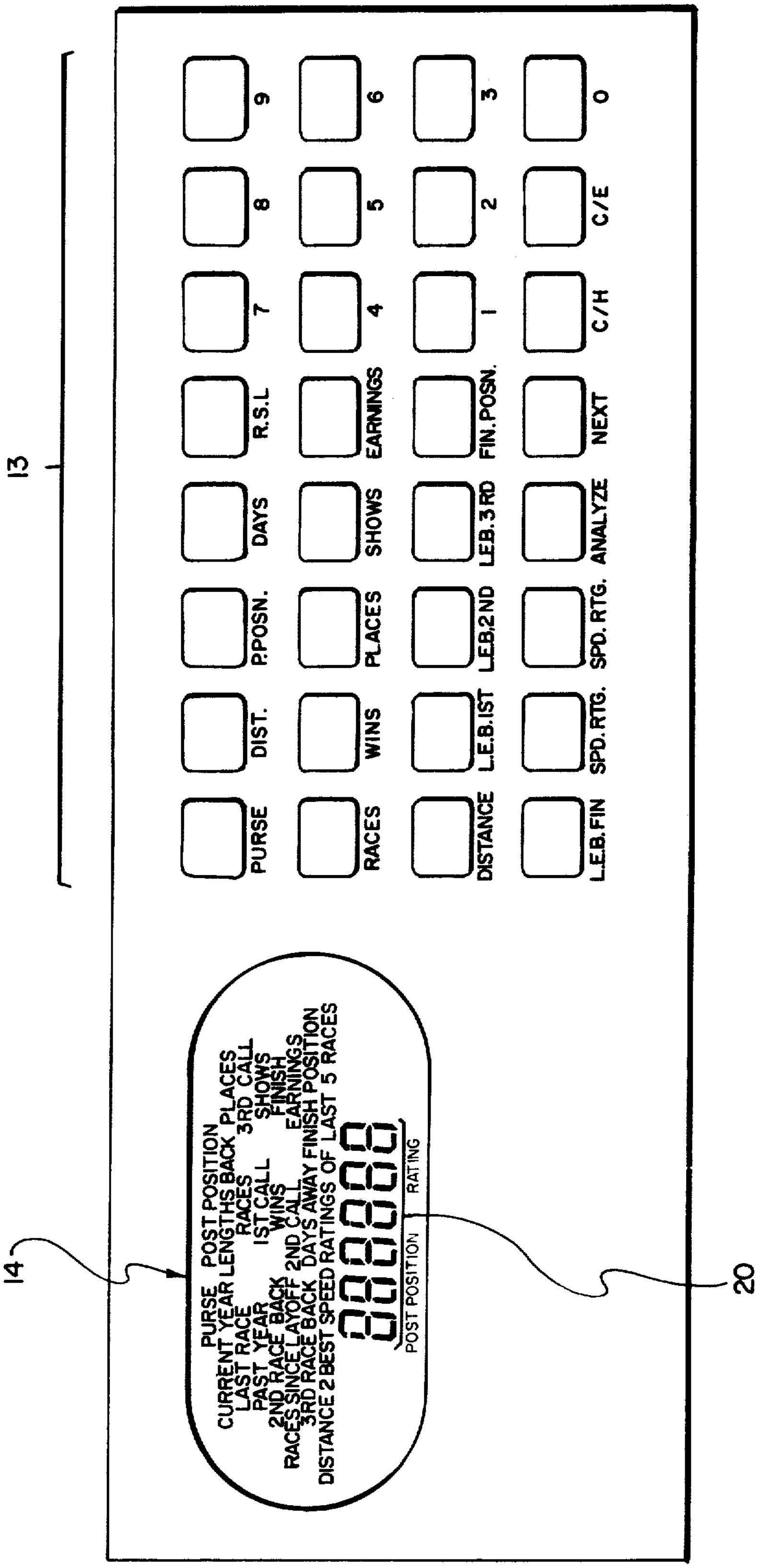
FIG. 2 is a view of a display and keyboard which may be used in the electronic game shown in FIG. 1.

FIG. 2 is an enlarged view of the upper surface of the housing 12 illustrating the keys 13 and the display 14. The display 14 is, in the preferred embodiment, a liquid crystal display having a number of words thereon which may be individually lit to provide particular messages in accordance with the play of the game. The display 14 also has six digit positions 20 which display data provided by the operator to the analyzer 10 and the results of the analysis accomplished by the analyzer 10.

As may be seen, in the preferred embodiment, the keys 13 are arranged in four rows and eight columns. The right most three columns include keys representing the digits zero through nine which are used for providing the numerical input data and two keys C/H and C/E, respectively. The key C/H is used as will be explained hereinafter for clearing all information regarding a particular horse while the key C/E is used for clearing a particular data input signal.

A number of pieces of information are utilized by the analyzer 10 in providing the analysis of a thoroughbred horse race. In all, thirty-one pieces of information about each horse are used by the analyzer 10. Each piece of information is requested by a particular prompting word or set of words which is lit on the display 14 under control of the control circuitry. In response to this request, the operator depresses data keys 13 to furnish the information required and then depresses an entry key to cause that information to be entered. The words lit on the display 14 under control of the control circuit to prompt the operator are listed in Table I below in the order in which they appear for each horse during the operation of the analyzer 10. Listed opposite each group of prompting words is the entry key 13 which is depressed by the operator in order to cause the particular data to be entered by the control circuit of the analyzer 10.

TABLE I

| | Display Message | Entry Key |
|---|---|---|
| 1 | PURSE | PURSE |
| 2 | DISTANCE | DIST. |
| 3 | POST POSITION | P.POSN. |
| 4 | DAYS AWAY | DAYS |
| 5 | RACES SINCE LAYOFF | R.S.L. |
| 6 | CURRENT YEAR/RACES | RACES |
| 7 | CURRENT YEAR/WINS | WINS |
| 8 | CURRENT YEAR/PLACES | PLACES |
| 9 | CURRENT YEAR/SHOWS | SHOWS |
| 10 | CURRENT YEAR/EARNINGS | EARNINGS |
| 11 | PAST YEAR/RACES | RACES |
| 12 | PAST YEAR/WINS | WINS |
| 13 | PAST YEAR/PLACES | PLACES |
| 14 | PAST YEAR/SHOWS | SHOWS |
| 15 | PAST YEAR/EARNINGS | EARNINGS |
| 16 | LAST RACE/DISTANCE | DISTANCE |
| 17 | LAST RACE/LENGTHS BACK/1st CALL | L.E.B.1st |
| 18 | LAST RACE/LENGTHS BACK/2nd CALL | L.E.B.2nd |
| 19 | LAST RACE/LENGTHS BACK/3rd CALL | L.E.B.3rd |
| 20 | LAST RACE/FINISH POSITION | FIN.POSN. |
| 21 | LAST RACE/LENGTHS BACK/FINISH | L.E.B.FIN. |
| 22 | 2nd RACE BACK/DISTANCE | DISTANCE |
| 23 | 2nd RACE BACK/LENGTHS BACK/1st CALL | L.E.B.1st |
| 24 | 2nd RACE BACK/LENGTHS BACK/2nd CALL | L.E.B.2nd |
| 25 | 2nd RACE BACK/LENGTHS BACK/3rd CALL | L.E.B.3rd |
| 26 | 2nd RACE BACK/FINISH POSITION | FIN.POSN. |
| 27 | 2nd RACE BACK/LENGTHS BACK/ FINISH | L.E.B.FIN. |
| 28 | 3rd RACE BACK/DISTANCE | DISTANCE |
| 29 | 3rd RACE BACK/LENGTHS BACK/1st CALL | L.E.B.1st |
| 30 | 2 BEST SPEED RATINGS OF LAST 5 RACES or | SPD.RTG. (left) |
| 31 | 2 BEST SPEED RATINGS | SPD.RTG. (right) |

The middle two keys ANALYZE and NEXT appearing in the center of the lowest row are also utilized in operating the analyzer 10 as will be explained hereinafter. More particularly, the key NEXT is used after all of the data regarding one horse in a race has been entered to indicate that data regarding the next horse is to be entered; and the key ANALYZE is depressed in order to cause the digits 20 of display 14 to light with the results of the analysis provided by the analyzer 10.

The analyzer 10 is utilized, in the preferred embodiment, for analyzing the characteristics of thoroughbred horses on fast dirt or firm turf tracks running distances of six furlongs or more. The analyzer 10 works best when the horses are experienced horses and have at least five races in their past performance statistics. The data utilized by the analyzer 10 may be found in the "Daily Racing Form" published by Daily Racing Form, Inc.

The analyzer 10 is operated in the following manner. The switch 15 is moved from the off to the on position causing the control circuit to light the word PURSE on display 14. The word PURSE is a prompting message which asks the operator to select by means of the digit keys 13 the amount of the purse for the particular race to be analyzed. As the amount of the purse is selected by depressing the digit-indicating ones of keys 13 in a selected order, the purse amount appears in the digit positions 20 on display 14. If a wrong number has been selected, the C/E key may be depressed to clear the entry and a new number entered. The amount of the purse may be entered into the RAM of the control circuit by depressing the PURSE key 13.

Depressing the PURSE key 13, in addition to entering the amount of the purse for the particular race, causes the prompting message DISTANCE to be illuminated on the display 14. This message asks the operator to indicate whether the race is a sprint race (less than a mile) or a route race (a mile or more). The operator selects the correct information by pressing the "1" key 13 if the race is a sprint race or the "2" key 13 if the race is a route race; and the information is shown by digits 20. Again, the entry may be cleared by depressing the C/E key 13; and a new entry may be selected and entered prior to entering the information. The distance of the race is entered by depressing the "DIST" key 13.

In addition to entering the race distance indication into the memory of the control circuit, the control circuitry causes the words POST POSITION to be displayed on display 14 when the DIST key 13 is depressed. The prompting message POST POSITION asks the operator to select by means of the digital keys 13 the post position of the horse in the race being analyzed. As with all other data selected in response to prompting, this data indication is shown by the digits 20 on the display 14 before entry into the memory of the control circuit. The information may be cleared as explained above by depressing the C/E key 13 or by depressing the C/H key 13. The post position is entered by depressing the P.POSN key 13.

It should be noted that the post position is the first of a number of entries which are made by the operator which relate to only one particular horse in the race. All of the information regarding that horse may be cleared by depressing the C/H key 13. Depression of the C/H key 13 also causes the control circuit of the analyzer 10 to cause the prompting message DISTANCE to appear on display 14 thereby returning the stage of entry to the initial point for the particular horse.

When the P.POSN key 13 is depressed to enter the post position of a particular horse, the control circuit causes the display 14 to display the prompting message DAYS AWAY. The message DAYS AWAY asks the operator to enter the number of days between the race being analyzed and the last date on which the particular horse ran. This number is selected by depressing selected ones of the digit keys 13 and appears on display 14 in digit positions 20. The number may be cleared by depressing the C/E or C/H keys 13 and may be entered by depressing the DAYS key 13.

Depressing the DAYS key 13 stores the number of days since the last race of the horse of interest and causes the display 14 to display a prompting message RACES SINCE LAYOFF. The message RACES SINCE LAYOFF asks the operator to enter the number of races in which the horse of interest has been involved since the last time that horse had a thirty day layoff without any race. The RACES SINCE LAYOFF information is selected by depression of the pertinent ones of the digit keys 13 and appears in the digit positions 20 so that, as with all other data selections, it may be checked before entry. The RACES SINCE LAYOFF data is entered into the memory of the control circuit by depression of the RSL key 13.

Depression of the RSL key 13 enters the data regarding the number of races since the last layoff and causes the display 14 to light the words CURRENT YEAR and RACES. The prompting message CURRENT YEAR RACES asks the operator to select and enter data indicating the number of races run by the particular horse during the particular calender year. This data is selected by means of the digit keys 13 and is displayed in digit positions 20 on the display 14 before entry. The information is entered by the operator depressing the RACES key 13.

Depression of the RACES key 13 enters the data regarding the number of races during the current year and causes the display 14 to light the words CURRENT YEAR and WINS. The prompting message CURRENT YEAR WINS asks the operator to select the number of wins which the particular horse has had in the current (calendar) year by depression of selected ones of the digit keys 13. The selection of the proper data indicating the number of wins for the particular horse in the current year is displayed in digit positions 20 and may be entered by the operator by depressing the WINS key 13.

Depression of the WINS key 13 enters the current year wins data and causes the display 14 to show the words CURRENT YEAR and PLACES. The prompting message CURRENT YEAR PLACES asks the operator to select and enter data regarding the number of second place finishes (places) of the horse of interest during the current year. The operator selects the data to be entered by the depression of selected digit keys 13, and this information is displayed in digit positions 20 on display 14. The information may be entered into the RAM of the control circuit by the depression of the PLACES key 13 by the operator.

Depression of the PLACES key 13 enters the CURRENT YEAR PLACES information and causes the display 14 to light the words CURRENT YEAR and SHOWS. The prompting message CURRENT YEAR SHOWS asks the operator to select and enter data regarding the number of third place finishes (shows) by the particular horse during the current year. After this information has been selected by the operator by depressing digit keys 13 and displayed in digit positions 20, it may be entered by the operator by depressing the SHOWS key 13.

Depression of the SHOWS key 13 enters the shows information for the current year and causes the display 14 to light the words CURRENT YEAR and EARNINGS. The prompting message CURRENT YEAR EARNINGS asks the operator to select and enter a number indicating the earnings of the horse of interest during the current year. This information, when selected by depression of the digit keys 13, is shown in digit positions 20 and may be entered by depression of the EARNINGS key 13 by the operator.

Depression of the EARNINGS key 13 enters the current year earnings into the memory of the control circuitry and causes the display 14 to show the words PAST YEAR and RACES. This prompting message asks the operator to select and enter the number of races run by the horse of interest during the year immediately preceding the current year. When this information has been selected and entered by the operator by depressing the digit keys 13 and then the RACES key 13, the display 14 shows a prompting message PAST YEAR WINS. This prompting message asks the operator to select and enter the number of wins by the particular horse during the year immediately preceding the current year. When this information is selected by the operator using digit keys 13 and entered by pressing the WINS key 13, the display 14 shows the prompting message PAST YEAR PLACES. This message asks the operator to select and enter the number of second place finishes by the particular horse during the year immediately preceding the current year. When this information has been selected and entered by the operator by depression of the digits keys 13 and the PLACES key 13, the display 14 shows the message PAST YEAR SHOWS. This prompting message asks the operator to indicate and enter the number of third place finishes by the particular horse during the year immediately preceding the current year. When this information has been selected and entered by the operator by depressing the digits key 13 and the SHOWS key 13, the display 14 illustrates the words PAST YEAR EARNINGS. This prompting message asks the operator to select and enter the amount the horse won in races during the year immediately preceding the current year. After selection, depression of the EARNINGS key 13 by the operator enters the information into the RAM of the control circuit.

Depression of the EARNINGS key 13 to enter the past year earnings causes the display 14 to light the words LAST RACE and DISTANCE. The prompting message LAST RACE DISTANCE asks the operator to select a numerical indication as to whether the last race run by the horse of interest was a sprint race or a route race. As with the previous entry of the distance for the immediate race, this information is indicated by depressing the "1" key 13 to indicate a sprint race or depressing the "2" key 13 to indicate a route race. The information is displayed by digit positions 20 of display 14 and may be entered in the RAM of the control circuit by the operator depressing the DISTANCE key 13.

Depressing the DISTANCE key 13 causes the entry of the distance information for the last race and causes the display 14 to light the words LAST RACE, LENGTHS BACK, and 1ST CALL. The prompting message LAST RACE/LENGTHS BACK/1ST CALL asks the operator to select a numerical indication of the number of lengths back that the horse of interest was at the first call during its last race. Lengths back are indicated in the "Daily Racing News" at each of a first call, a second call, a third call, and a finish position. The indication is of the number of lengths the horse was behind the leader. The operator selects this information by depressing the appropriate digit keys 13 and enters the information by depressing the L.E.B. 1ST key 13.

Depressing the L.E.B. 1ST key 13 causes the entry of the aforementioned information and causes the display 14 to light the words LAST RACE/LENGTHS BACK/2ND CALL. This prompting message asks the operator to select by means of the digit keys 13 the number of lengths the horse of interest was behind at the second call in its last race and to enter that information by depressing the L.E.B..2ND key 13. Depression of the L.E.B. 2ND key 13 enters the information and causes the display 14 to light the words LAST RACE/-

LENGTHS BACK/3RD CALL. This prompting message asks the operator to select the number of lengths back for the particular horse at the third call in its last race. This information is shown in digit positions 20 and is entered by the operator by depressing the L.E.B. 3RD key 13 which causes the display 14 to illuminate the words LAST RACE/FINISH POSITION. This message asks the operator to indicate the place in which the horse finished in the race. The finish position is selected by the operator by depressing the digit keys 13 and is shown in digit positions 20. This data is entered by the operator depressing the FIN. POSN key 13 which causes the display 14 to light the words LAST RACE/LENGTHS BACK/FINISH. This prompting message asks the operator to enter the number of lengths back (zero, if the horse finished first) that the particular horse finished in its last race. The information is selected by the operator and is entered by depressing the L.E.B. FIN. key. 13.

Entry of the last race finish information causes the display to light the words 2nd RACE BACK-/LENGTHS BACK/1ST CALL which is selected by the operator and entered by depressing the L.E.B. 1ST key 13. In like manner, the operator selects and enters information in response to promptings 2ND RACE BACK/LENGTHS BACK/2ND CALL, 2ND RACE BACK/LENGTHS BACK/3RD CALL, 2ND RACE BACK/FINISH POSITION, and 2ND RACE BACK/FINISH.

Once this sequence of information has been entered, the display 14 is caused to light the words 3RD RACE BACK/DISTANCE asking the operator to select the distance for the third race back and to enter that information by depressing the DISTANCE key 13. Depressing the DISTANCE key 13 enters the information and causes the display 14 to display 3RD RACE BACK-/LENGTHS BACK/1ST CALL asking the operator to select the lengths back for the particular horse in its third race back and to enter that information on depression of the L.E.B. 1ST key 13.

After the information regarding the third race back has been entered, the control circuit causes the display 14 to light the words 2 BEST SPEED RATINGS OF LAST 5 RACES in the case of a route race. This prompting message asks the operator to enter the horse's two best speed ratings indicated by the "DAILY RACING NEWS" for the last five races. When the first speed rating has been selected by the operator by depressing the digit keys 13 and entered by depressing the left-hand SPD. RPG key 13, the display 14 shows 2 BEST SPEED RATINGS OF LAST 5 RACES asking the operator to select using digit keys 13 and then enter the second of the two best speed ratings by depressing the right-hand SPD. RTG key 13.

If the race is a sprint race instead of a route race, the display 14 shows the words 2 BEST SPEED RATINGS after the information regarding the THIRD RACE BACK has been entered. This prompting message asks the operator to enter the speed ratings for the particular horse's most recent good races. A good race is defined for the purposes as a race in which the horse finished in first, second, or third positions or less than three lengths behind the winner. When this information has been selected by the operator and entered by depressing the left hand SPD. RTG. key 13, the message key 13, the message 2 BEST SPEED RATINGS is again displayed asking the operator to enter the second of the two best speed ratings. This information is entered by depressing the right-hand SPD.RTG. key 13.

Once the information has been entered regarding the last of the two best speed ratings for the first horse in the race, if there are more horses to analyze, the NEXT key 13 is depressed by the operator causing the display 14 to show again the word DISTANCE. This asks the operator to begin again with the next horse in the race to be analyzed. When information regarding all horses in the race has been finally entered, the ratings of the top four horses may be obtained by depressing the ANALYZE key 13. Upon the first depression, the digit positions 20 show a five digit number in the preferred embodiment of the invention. The two digits of the number to the left indicate the post position of the horse having the highest rating and the three digits to the right indicate the rating. Depressing the analyze key a second time causes the rating of the second best horse and its post position to appear in digit positions 20. Depressing the ANALYZE key 13 again, and then again, displays the same information for the third and fourth best horses. Thereafter, depressing the analyze key 13 causes the ratings for the top four horses to reappear in sequence. The ratings given for the top four horses are on a zero to five hundred scale in the preferred embodiment with the higher ratings being better.

In order to analyze another race the switch 15 is placed in the off position and then returned to the on position whereupon the entire sequence of entry may be undertaken for the next race.

Figure 3:
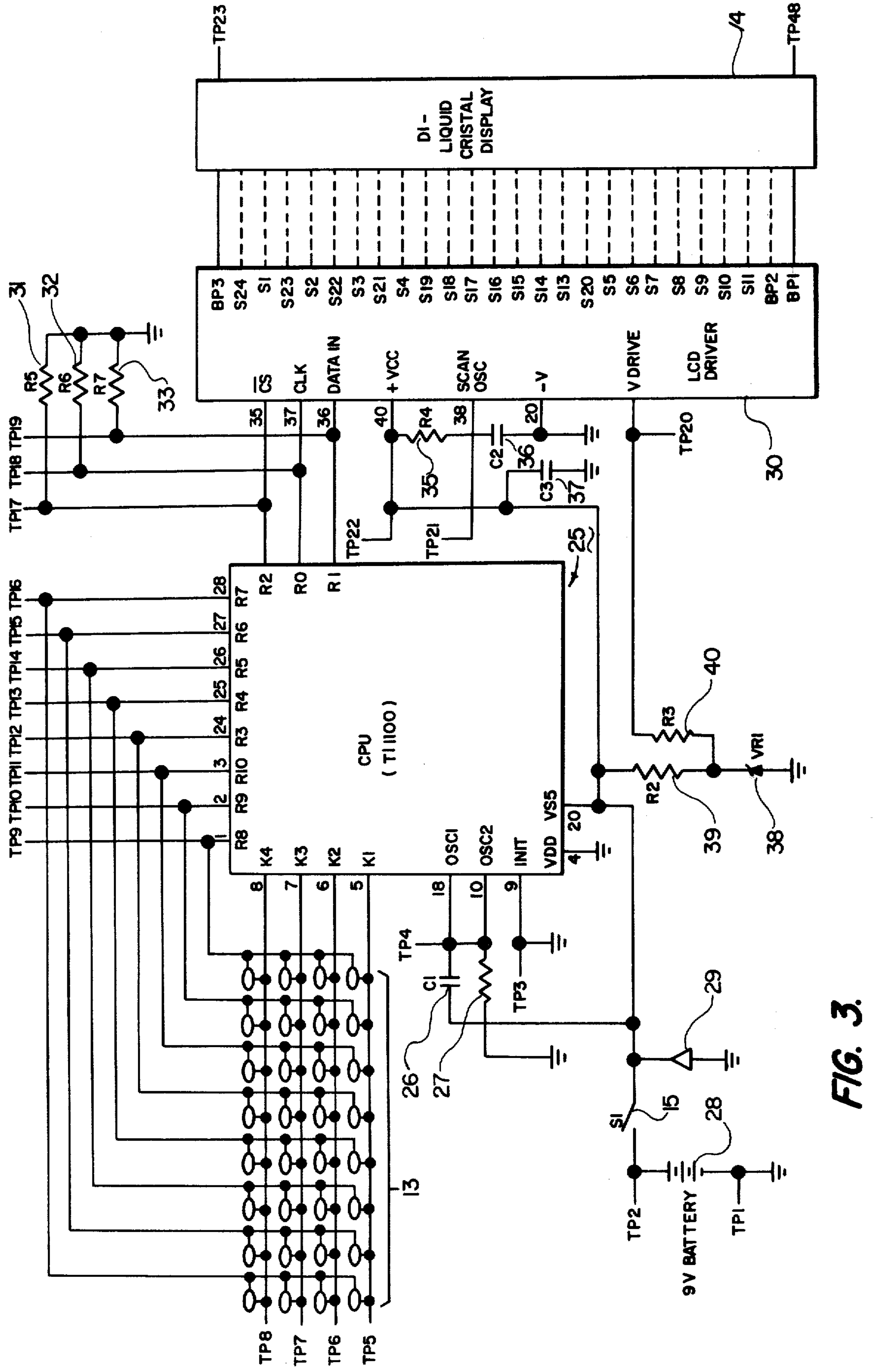
FIG. 3 is a circuit diagram, partially in block and partially in schematic form, of circuitry which may be utilized in the electronic analyzer of this invention.

FIG. 3 illustrates a partially block/partially schematic diagram of circuitry which may be utilized to implement the analyzer 10 of this invention. The switches 13 are shown in the upper left hand corner of FIG. 3. Each of the switches in row 1 is connected at a terminal KI of a control circuit 25. Each of the switches in row 2 is connected at a terminal K2, each of the switches in row 3 is connected at a terminal K3, and each of the switches in row 4 is connected at a terminal K4 of the control circuit 25. In order to complete the selection processes, each of the switches in each of the columns is connected, respectively, at terminals R8, R9, R10, R3, R4, R5, R6 and R7 of the control circuit 25.

The control circuit 25 is, as mentioned above, a Texas Instruments TMS1100 microprocessor in the preferred embodiment. A capacitor 26 and a resistor 27 are each connected to a pair of terminals OSC1 and OSC2 to control the timing pulses of the control circuit 25.

The capacitor 26 is also connected by the switch 15 to a battery 28. The battery 28, which in the preferred embodiment of the invention is a nine volt transistor battery, is connected between ground and an input terminal VS5 of the circuit 25. A diode 29 is connected in circuit between the battery and ground to protect circuit 25 from reverse charges. The resistor 27, a terminal INIT, and a terminal VDD are connected to ground.

Output signals are taken from the circuit 25 at terminals R0, R1, and R2 and are transferred to a liquid crystal display driver circuit 30. Biasing resistors 31, 32 and 33 are connected between ground and the conductors connected at terminals R2, R0, and R1, respectively. The output terminal R2 on circuit 25 is connected to an input terminal $\overline{CS}$; the terminal R0 to an input terminal CLK; and the output terminal R1 to an input terminal DATA IN of the LCD driver circuit 30. A resistor 35 and a capacitor 35 are connected to input terminals VCC, scan OSC, and −V on the driver 30 to provide timing pulses for the LCD driver circuit 30. Terminal VCC is also connected to the battery 28 by the switch 15. A capacitor 37 is connected between the terminal VCC and ground. An arrangement including a varactor 38 and a resistor 39 connected in series between ground and the terminal VCC is used to obtain a voltage reference which is applied via a resistor 40 to a terminal V DRIVE on the LCD driver 30. Output signals are taken from the LCD driver 30 and transferred to operate the liquid crystal display 14 in a manner well known to the prior art.

Figure 4:
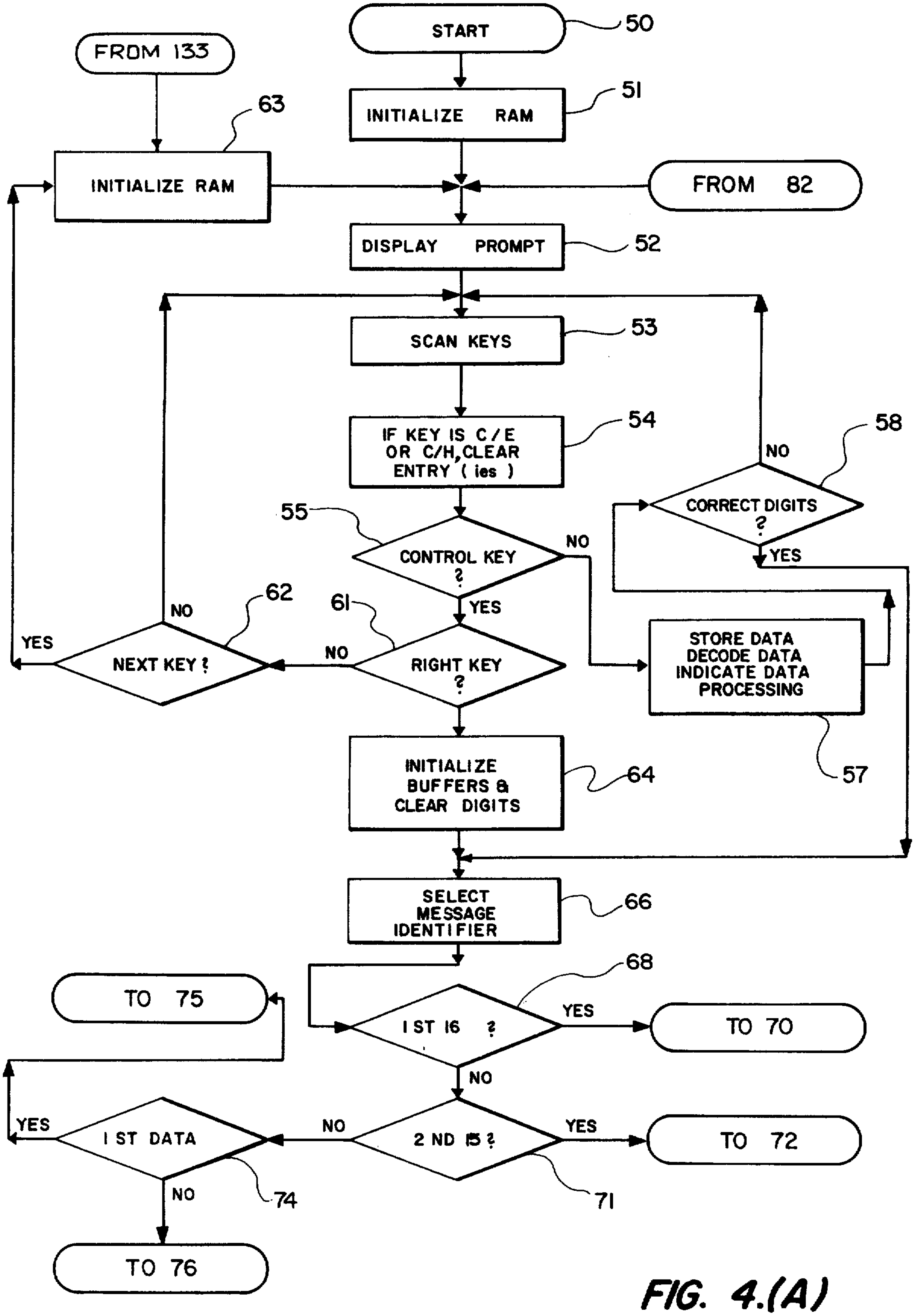
FIGS. 4(*a*)–4(*e*) together constitute a flow chart describing the operation of the preferred embodiment of the invention shown in FIGS. 1, 2, and 3.
Figure 4:
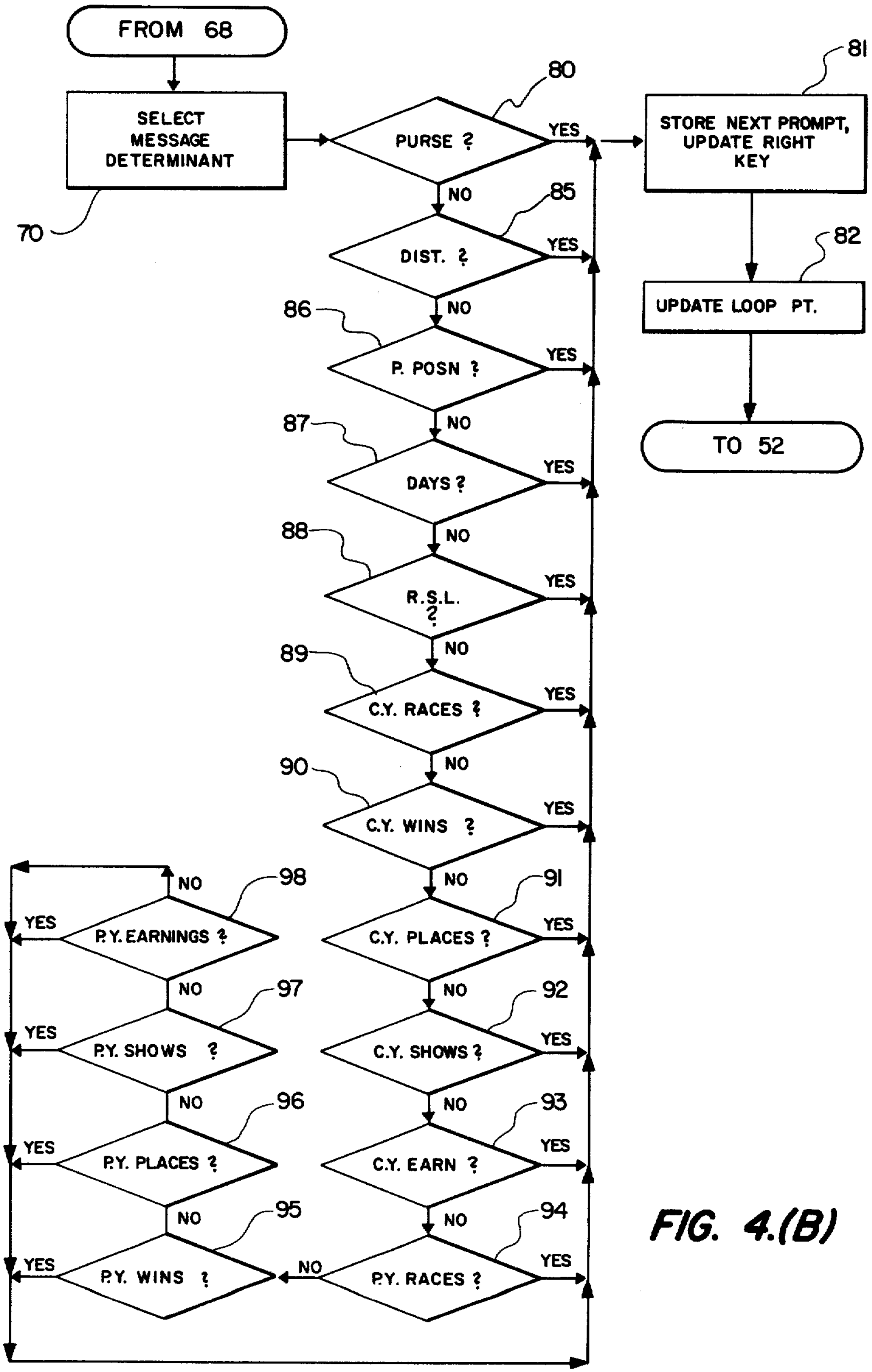
Figure 4:
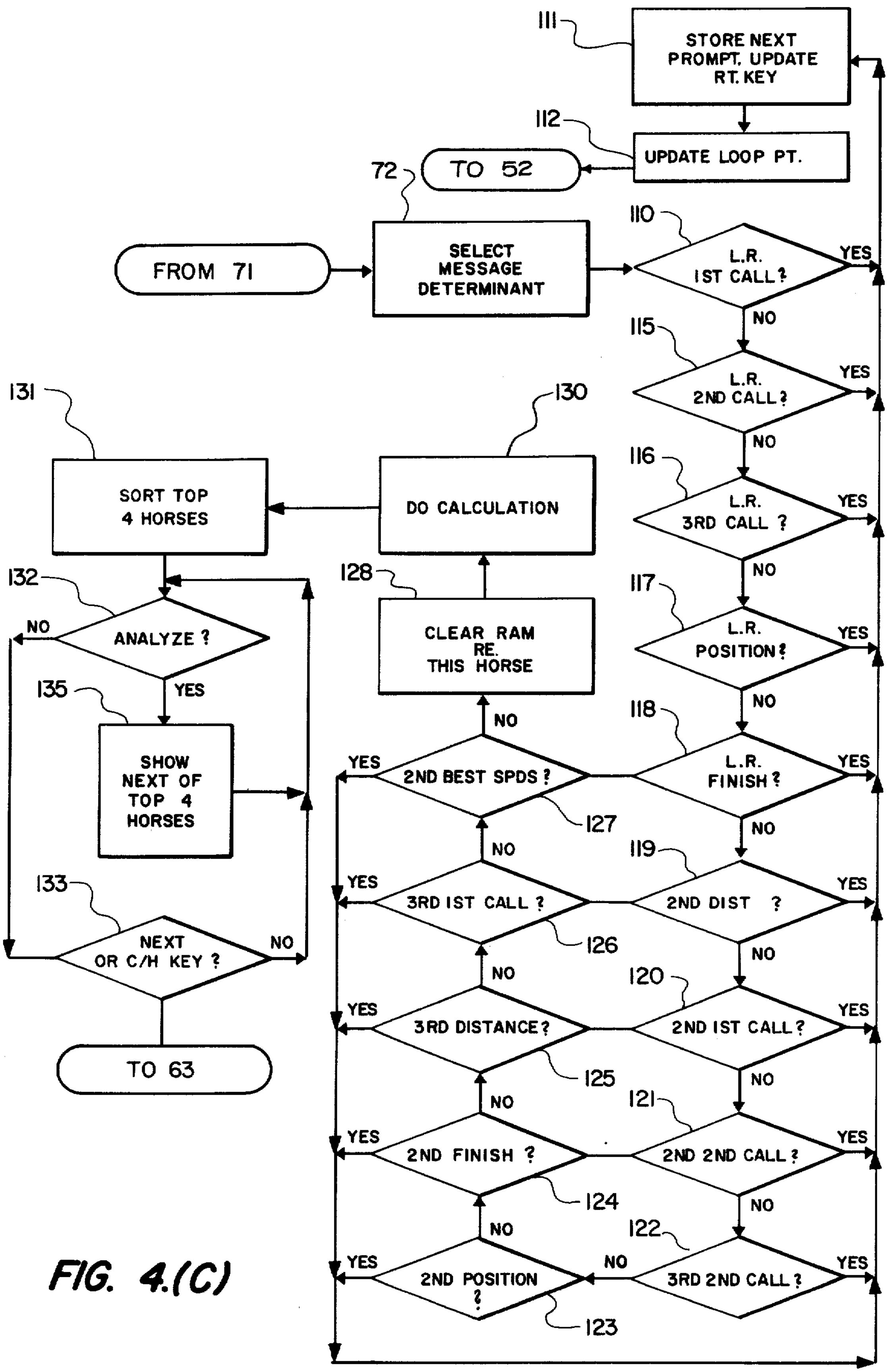
Figure 4:
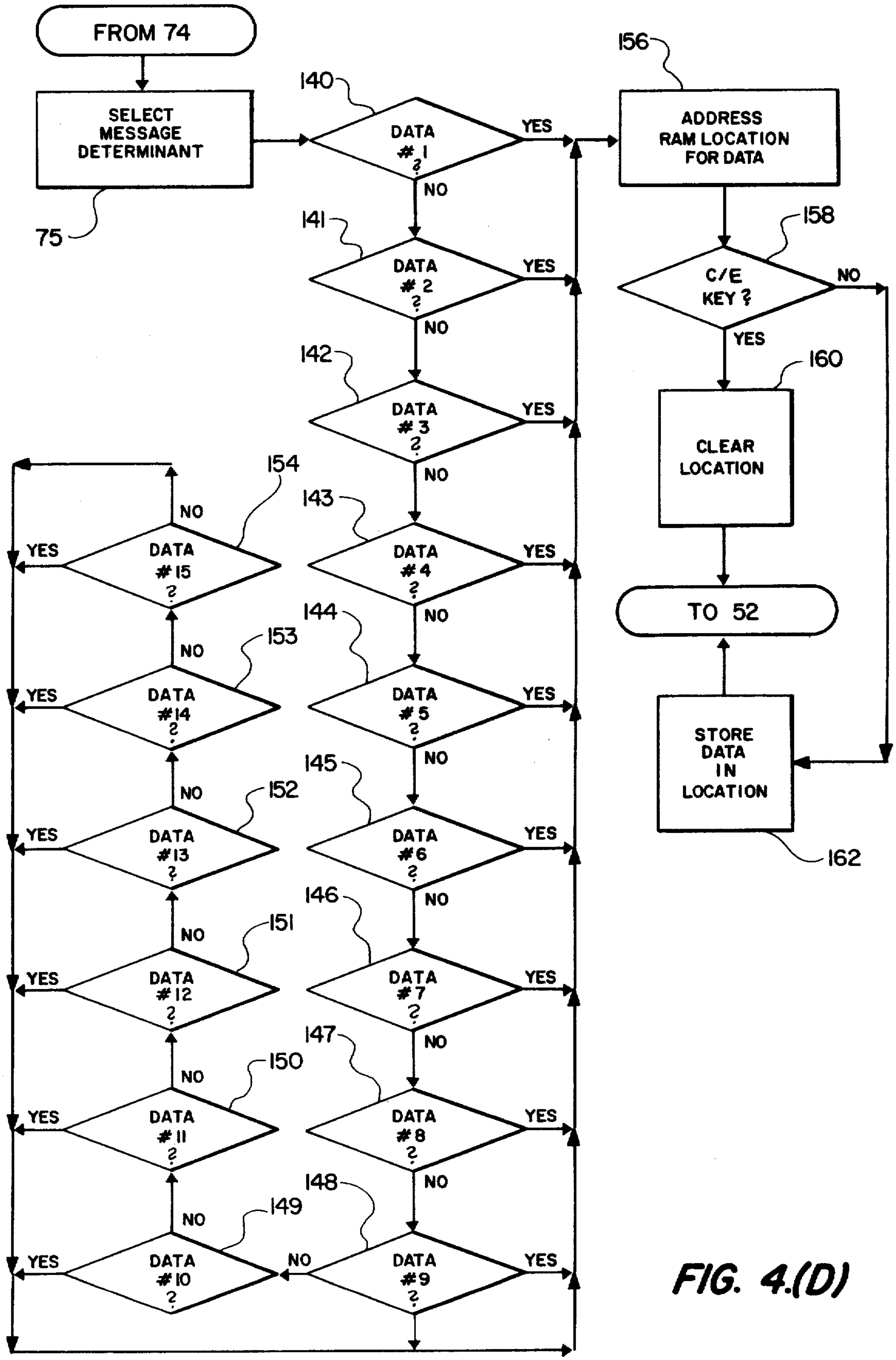
Figure 4:
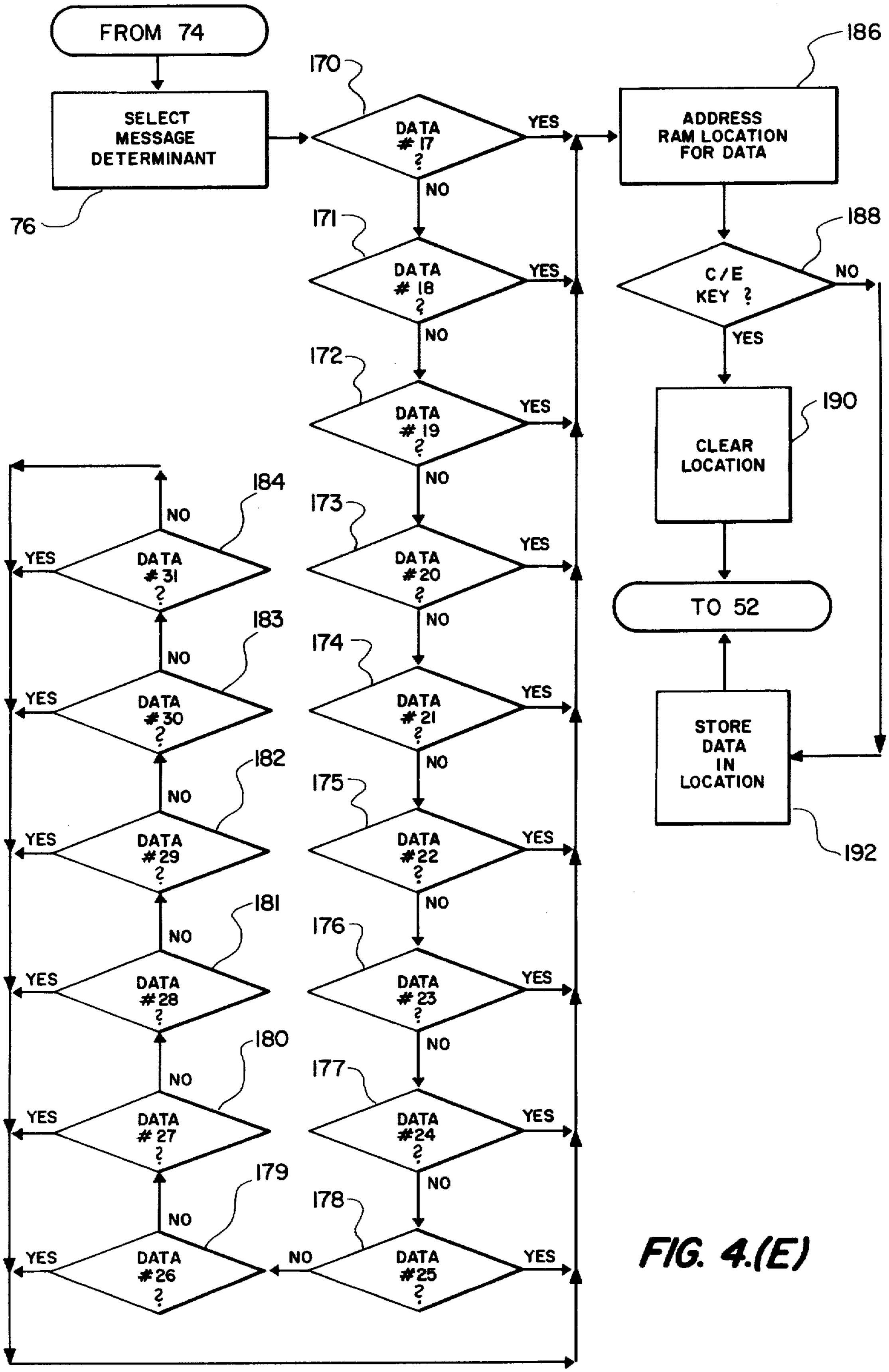

FIGS. 4(*a*)-4(*e*) together constitute a flow chart which describes the operation of the control circuit in the preferred embodiment of this invention. The routine shown in FIG. 4(*a*) commences at step 50 when the switch 15 is placed in the on position. The program immediately moves to step 51 at which the RAM of the control circuit 25 is initialized by zeroing registers, storing an indication that the next key 13 to be depressed is the PURSE key 13, and storing the word PURSE in a display buffer. From step 51, the program moves to step 52 to display the prompting message (in this case, PURSE) on the display 14.

The program then moves to step 53 in which the keyboard is scanned to determine whether an input has been provided by the operator. The program waits at step 53 until an input is provided, stores the input in the RAM, and then moves to step 54 at which the input detected is checked to determine whether the C/E or C/H key 13 has been depressed. If the C/E key 13 has been depressed, the entry is cleared. If the C/H key 13 has been depressed, all information regarding the particular horse is cleared. The program then moves to step 55 at which it is determined whether the key 13 depressed is one of the control leys 13. The control keys are all of the keys 13 other than the number keys 13. If a control key 13 has not been depressed, the program moves to step 57 to store the data entry, to decode the particular data entry, and to store an indication that data is presently being processed.

From step 57 the program moves to step 58 where a determination is made as to whether the data entered is a correct number for the particular entry. For example, the correct entry when the length of a particular race is being entered can only be numbers "1" or "2". If the data entered is not correct for the particular entry, the program recycles to step 53 and repeats as explained above. If the entry is appropriate, the program moves from step 60 to step 66 which will be explained below.

From step 55 if a control key 13 is depressed, the program moves to step 61 to determine whether the correct control key 13 has been depressed. It will be recalled that at step 51, the purse key 13 was set as the correct control key for depression in the first cycle of operation. A comparison is made at step 61 to determine if the store "correct" key 13 has been depressed. If not, the program moves to step 62 to test for depression of the "NEXT" key 13. If the NEXT key 13 was not depressed, the program recycles to step 53. If the NEXT key 13 was depressed at step 62, the program moves to step 63 at which the RAM is again initialized to accept information regarding the second horse and the display 14 is caused to display the word DISTANCE indicating the beginning of data inputs for the next horse. From step 63 the program moves to step 52 and repeats as discussed above.

If at step 61 the correct control key 13 has been depressed, the program moves to step 64 to initialize certain store positions of the RAM and to clear the numerical display. From step 64 the program moves to step 66.

The program also moves to step 66 from step 58 if the correct digit number for a data entry has been provided by the operator. At step 66, a review is made of the particular message being processed to identify that message. From step 66, the program moves to step 68 where it is determined whether the particular message is caused by depression of one of the first sixteen control keys 13 by the operator in order to enter information in response to the first sixteen prompting messages of Table I; that is, whether the key 13 depressed is one from PURSE to LAST RACE/DISTANCE the right hand column of Table I. If the message is one entering the response to one of the first sixteen prompting messages, the program moves to step 70 which is shown in FIG. 4(*b*) and processes that particular information as will be explained hereinafter. If the message is not one of the first sixteen control entry key messages, the program moves to step 71 to determine whether the message is one of the second group of control entry key messages initiated by depressing the second group of fifteen control keys 13 shown in Table I. If the message is one of the second group of control key messages, the program moves to step 722 which is shown in FIG. 4(*c*). If the message is not one of the control key messages, the program moves from step 71 to step 74 to determine whether the message is data which is to be utilized with the first sixteen control key messages. If the information is data to be used with the first sixteen control key messages, the program moves to step 75 which is shown in FIG. 4(*d*). If the information is not data to be used with the first sixteen control key messages, the information must be data used with the second group of control key messages, and the program moves to step 76 which is shown in FIG. 4(*e*).

FIG. 4(*b*) shows that portion of the program commencing with step 70 to which the program moves from step 68 if one of the first sixteen control keys 13 has been depressed. At step 70 the message is disected so that the particular message being processed may be determined. From step 70, the program moves to step 80 at which a determination is made as to whether the key 13 depressed is PURSE. If the key 13 is "PURSE", the program moves to step 81 to store an indication of the next prompting message to be presented by the display (i.e., DISTANCE) and to indicate the next "right key". The program then moves to step 82 to increment the indication of the point at which the program stands and then moves to step 52 and repeats the cycle as explained above.

If at step 80 the message being processed is not caused by the depression of the PURSE key 13, the program moves to step 85 to determine whether the message is caused by the "DIST" key 13 being depressed. If the "DIST" key 13 has been depressed, the program moves to step 81 to cause the next prompting message (POST POSITION) to be stroed for presentation by display 14 and then moves to step 82 and continues as explained above.

The program moves from step 85 if the "DIST" key 13 was not depressed through steps 86–98 until the one of the control keys 13 responding to the first prompting messages in Table I is determined, When the depressed control key 13 is determined, the program moves to step 81 and continues as explained above, ultimately ending at step 52 and recycling. It should be noted that at step 98, a "no" answer indicates that the DISTANCE key 13 has been depressed and at step 81 the message LAST RACE/LENGTHS BACK/2ND CALL is stored for display.

FIG. 4(*c*) begins with step 72 and continues investigating the second set of messages caused by depression of the control keys 13 used to enter the data responding to the last fifteen prompting messages in Table I. At step 72, the determinant for each of the messages is segregated; and the program moves to step 110 at which it is determined whether the key 13 depressed in the L.E.B. 1st key 13 responding to the message LAST RACE/LENGTHS BACK/FIRST CALL. If the L.E.B. 1st key 13 is depressed responding to this message, the program moves to step 111 to move the next prompting message (LAST RACE/LENGTHS BACK/2ND CALL) into the display buffer of the RAM and to update the condition of the right key message register in the RAM. From step 111 the program moves to step 112 to increment the loop point counter and then recycles to step 52 to update the display to show the next prompting message and go through the steps of the program again.

In like manner, if at step 110 the message does not relate to the lengths behind at the first call in the last race, the program moves to step 115 to determine whether the message relates to the second call position in the last race, to step 116 to determine whether the message relates to the third call position in the last race, to step 117 to determine whether the message relates to the finish position in the last race, to step 118 to determine whether the message relates to the distance of the second race back and so on (checking each of the messages shown in order in Table I) to step 127 at which, if it is determined that this is not the first of the two speed ratings for the last five races, the program moves to step 128 to clear certain stores of the RAM having completed the information with regard to the particular horse.

From each of these steps 115–127 presuming that the message is the appropriate message for the particular step caused by depression of the correct entry key 13 for one of the last fifteen display messages, the program moves to step 111 at which the display buffer of the RAM receives the next prompting message and the right key for the next input is stored in the RAM. From step 111, the program moves to step 112 and proceeds as explained above to loop back to step 52 shown in FIG. 4(*a*) and recycles.

After clearing certain stores of the RAM of information regarding the last horse at step 128, the program moves to step 130 at which the calculation for computing the horses most likely to win is accomplished. In the preferred embodiment of the invention, the formula used for sprint races is 5.1 minus (0.0354 multiplied by average earnings) plus (0.00247 multiplied by days) plus (0.0454 multiplied by SP) minus (0.00629 multiplied by speed rating total).

For route races the formula used is 5.2 plus (0.0808 multiplied by POST) minus (0.0377 multiplied by average earnings) plus (0.00251 multiplied by days) plus (0.00336 multiplied by SP) minus (0.00805 multiplied by speed rating total). In the above equations, average earnings per start is calculated as a percentage of the purse of this race. Days means the number of days since the horse has raced last, and SP is the sum of the lengths behind at the first call for the last three races for the horse.

These formulas have been determined through a statistical summary of the results of races and provide numbers between zero and five hundred, one of which is assigned to each horse, with the higher numbers being more likely to win. From step 130, the program moves to step 131 to sort the ratings for the top four horses and then moves to step 132 to determine whether the ANALYZE key 13 has been depressed. If the ANALYZE key 13 has not been depressed, the program moves to step 133 to determine whether either the NEXT key 13 or the C/H key 13 had been depressed. If not, the program recycles to step 132 to determine again whether the ANALYZE key 13 has been depressed. If either the NEXT key 13 or the C/H key 13 has been depressed, the program moves back to step 63 shown in FIG. 4(*a*) and awaits the entry of data regarding the next horse.

If at step 132 the analyze key has been depressed, the program moves to step 135 to show the first of the top four horses. The number displayed by the digits 20 of the display 14 is the post position of the horse and the rating thereof. From step 135, the program recycles to step 132 to determine whether the analyze key 13 has been depressed again. If so, the program moves to step 135 to display the second of the horses being analyzed, giving its post position and rating. This analyze cycles continues until all four top ratings have been shown and then repeats.

FIG. 4(*d*) continues the program beginning with step 75 and accomplishes the processing of the data satisfying the first sixteen prompting messages of Table I. At step 75, the identifying information regarding the particular message is selected. The program then moves to step 140 at which it is determined whether the information is data regarding the first of the sixteen messages. If not, the program moves through steps 141–154 until the correct step is reached. At the correct point, the program moves to a step 156 at which the RAM location for the information regarding the particular message is addressed and then moves to step 158 to determine whether the C/E key 13 has been depressed.

If at step 158 the C/E key 13 has been depressed, the program moves to step 160 to clear the RAM location and then recycles to step 52 shown in FIG. 4(*a*). If the C/E key 13 has not been depressed, the program moves to step 162 to store the data in the RAM location. The program then recycles to step 52 shown in FIG. 4(*a*).

FIG. 4(*e*) continues the program beginning with step 76 and accomplishes the processing of the data satisfying the last fifteen prompting messages of Table I. At step 76, the identifying information regarding the particular message is selected. The program then moves to step 170 at which it is determined whether the information is data regarding the first of the last fifteen messages. If not, the program moves through steps 171–184 until the correct step is reached. At the correct point, the program moves to a step 186 at which the RAM location for the information regarding the particular message is to be stored and then moves to step 188 to determine whether the C/E key 13 has been depressed.

If at step 188 the C/E key 13 has been depressed, the program moves to step 190 to clear the RAM location and then recycles to step 52 shown in FIG. 4(*a*). If the C/E key 13 has not been depressed, the program moves to step 192 to store the data in the RAM location. The program then recycles to step 52 shown in FIG. 4(*a*).

As will be understood by those skilled in the art, many different programs may be utilized to implement the flow chart disclosed in this specification. Obviously, those programs will vary from one another in various degrees. Other flow chart steps might also be used to accomplish the same results. However, it is well within the skill of the art of the computer programmer to provide particular programs for implementing each of the steps of the flow charts disclosed herein or to accomplish the same results. It is also to be understood that a number of other microcomputer circuits might be programmed for implementing each of the steps of the flow chart disclosed herein without departing from the teaching of the invention. Because various other embodiments may be devised by those skilled in the art without departing from the spirit and scope of the invention, it is the intention of the inventors to be limited only by the scope of the claims appended hereto.

What is claimed is:

1. A portable electronic horserace analyzer comprising control means, means for furnishing information to the control means regarding the race and the histories of each of the horses in the race including for each horse the performance of that horse at a plurality of positions during at least one prior race relative to the leading horse in that prior race, and a display for presenting information generated by the control means indicative of the likelihood of certain horses winning the race.

2. A portable electronic horse race analyzer as in claim 1 in which the control means includes means for causing the display to provide prompting messages asking an operator to provide information useful in analyzing a race.

3. A portable electronic horse race analyzer as in claim 1 in which the control means includes means for causing the display to present information as it is furnished to the control means so that the correctness of that information may be assessed.

4. A portable electronic horse race analyzer as in claim 1 in which the means for furnishing information to the control means includes a set of keys indicating numerals and types of information, and in which the control means responds to a key signifying a type of information by entering data indicated by keys indicating numerals and causes a prompting message to appear on the display to indicate the next information required.

5. A portable electronic horse race analyzer as in claim 1 in which the means for furnishing information to the control means further includes for each of the horses in the race the interval of time between the race being analyzed and the next prior race run by that horse.

* * * * *